US009170887B2

(12) United States Patent
Nakamura et al.

(10) Patent No.: US 9,170,887 B2
(45) Date of Patent: Oct. 27, 2015

(54) MEMORY SYSTEM AND CONTROLLING METHOD OF MEMORY SYSTEM

(71) Applicant: Kabushiki Kaisha Toshiba, Minato-ku (JP)

(72) Inventors: Yasunori Nakamura, Kawasaki (JP); Nobuhiro Ono, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 105 days.

(21) Appl. No.: 14/162,946

(22) Filed: Jan. 24, 2014

(65) Prior Publication Data

US 2015/0052397 A1    Feb. 19, 2015

Related U.S. Application Data

(60) Provisional application No. 61/865,749, filed on Aug. 14, 2013.

(51) Int. Cl.
  *G06F 11/14* (2006.01)
  *G06F 11/30* (2006.01)

(52) U.S. Cl.
  CPC ........ *G06F 11/1412* (2013.01); *G06F 11/3058* (2013.01)

(58) Field of Classification Search
  CPC .................................................. G06F 11/1412

USPC ................................ 714/15, 14, 16, 6.1, 6.11
See application file for complete search history.

(56) References Cited

U.S. PATENT DOCUMENTS

| 6,304,981 | B1 * | 10/2001 | Spears et al. .................... 714/24 |
| 8,019,929 | B2 | 9/2011 | Kimura |
| 2004/0103238 | A1 * | 5/2004 | Avraham et al. ............. 711/102 |
| 2010/0169687 | A1 | 7/2010 | Kimura |
| 2012/0159060 | A1 | 6/2012 | Yu et al. |

FOREIGN PATENT DOCUMENTS

| JP | 2008-210358 | 9/2008 |
| JP | 2010-152853 | 7/2010 |
| JP | 2012-133750 | 7/2012 |

* cited by examiner

*Primary Examiner* — Dieu-Minh Le
(74) *Attorney, Agent, or Firm* — Oblon, McClelland, Maier & Neustadt, L.L.P.

(57) ABSTRACT

According to one embodiment, when being notified of an interruption of an external electric power supply, a second processor performs a saving operation for storing management information and data stored in a first volatile memory to a first non-volatile memory, and records a progress log, indicating a progress of the saving operation, into a second volatile memory. The first processor periodically checks whether the progress log is recorded in the second volatile memory or not, and when the progress log is recorded in the second volatile memory, the first processor stores the progress log into the second non-volatile memory.

14 Claims, 3 Drawing Sheets

MEMORY SYSTEM AND CONTROLLING METHOD OF MEMORY SYSTEM

CROSS-REFERENCE TO RELATED APPLICATIONS

This application is based upon and claims the benefit of priority from U.S. Provisional Patent Application No. 61/865,749, filed on Aug. 14, 2013; the entire contents of which are incorporated herein by reference.

FIELD

An embodiment described herein relates generally to a memory system provided with non-volatile memory, and a controlling method of the memory system.

BACKGROUND

A memory system provided with non-volatile memory has a backup power source, such as a battery or a capacitor, for an invalid interruption of electric power supply. When detecting the invalid interruption of electric power supply, the memory system switches the power source to the backup power source from an external power source, and saves necessary data to the non-volatile memory from volatile memory within the period of supplying electric power by the backup power source in order to protect the data from being lost.

During the data saving operation, the non-volatile memory stores a progress log indicating the progress of the data save in order that the progress log is used for data recovery or failure analysis upon the data save.

Electric power exceeding the capacity of the backup power source cannot be consumed upon non-volatilization of the data and the progress log. Therefore, it is necessary to reduce the power consumption as much as possible to extend the backup time of the power source.

DETAILED DESCRIPTION

In general, according to one embodiment, a memory system includes a first non-volatile memory including a plurality of blocks being a unit of data erasing; a second non-volatile memory; a first volatile memory; a second volatile memory; a power supply circuit having a backup power source, and supplying externally supplied electric power to each unit in the memory system; a first processor that transmits and receives a command to a host, and stores data received from the host into the first volatile memory; and a second processor that transfers management information stored in the first non-volatile memory to the first volatile memory, and stores the data stored in the first volatile memory into the first non-volatile memory by using the transferred management information.

The power supply circuit supplies electric power from the backup power source to each unit in the memory system, when detecting the interruption of the external electric power supply. The power supply circuit supplies the electric power from the backup power source to each unit in the memory system, and notifies the first processor of the interruption of the external electric power supply, when detecting the interruption of the external electric power supply. When being notified of the interruption of the external electric power supply from the first processor, the second processor performs a saving operation for storing the management information and the data stored in the first volatile memory to the first non-volatile memory, and records a progress log, indicating a progress of the saving operation, into the second volatile memory. When being notified of the interruption of the external electric power supply from the power supply circuit, the first processor notifies the second processor of the interruption of the external electric power supply, and periodically checks whether or not the progress log is recorded in the second volatile memory. When the progress log is recorded in the second volatile memory, the first processor stores the progress log into the second non-volatile memory.

An exemplary embodiment of the memory system and the controlling method of the memory system will be explained below in detail with reference to the accompanying drawings. The present invention is not limited to the following embodiments.

Embodiment

Figure 1:
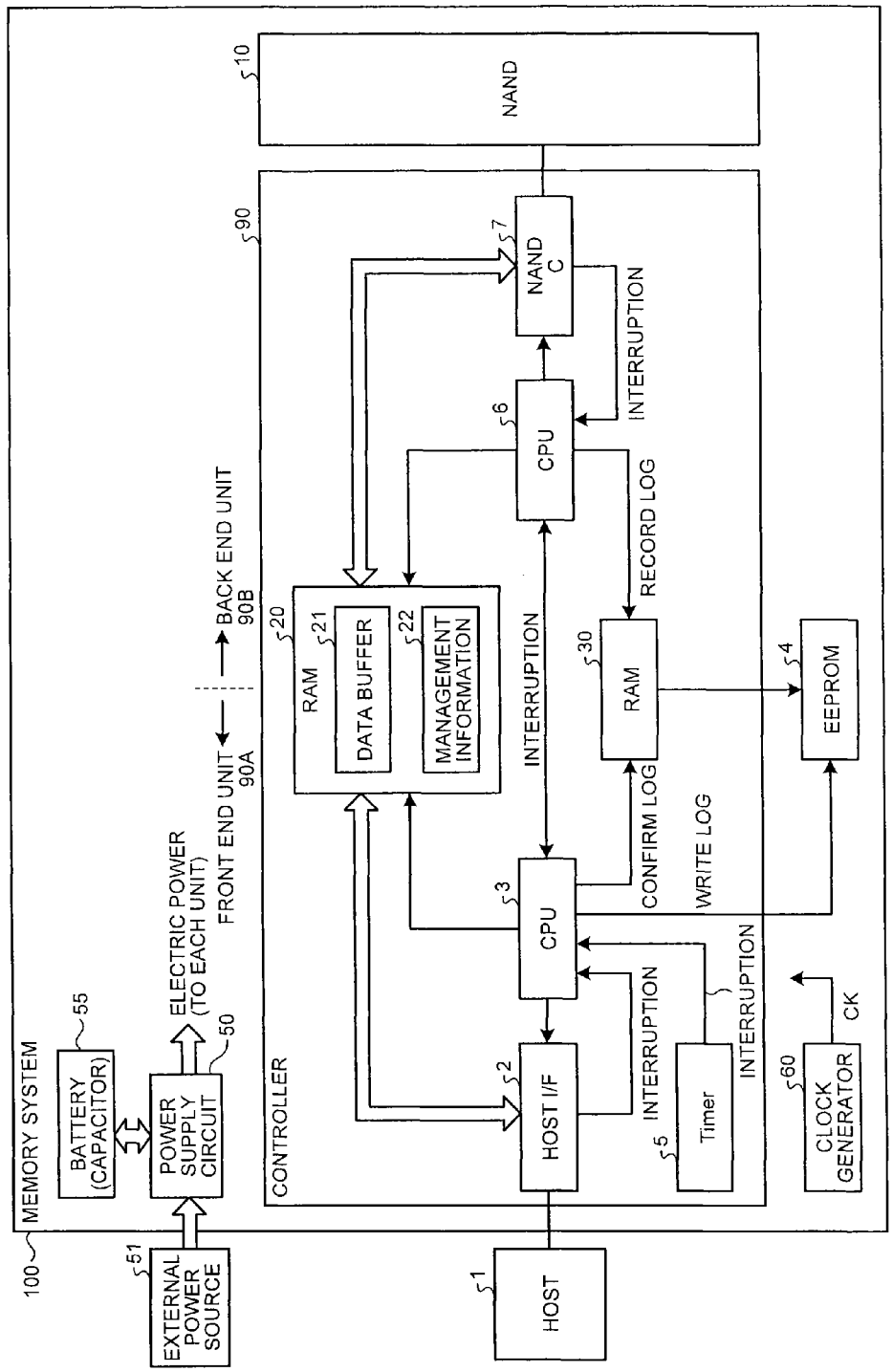
FIG. 1 is a functional block diagram illustrating an internal configuration of a memory system.

FIG. 1 illustrates an example of a configuration of a memory system 100. The memory system 100 is an SSD (Solid State Drive), for example. The memory system 100 is connected to a host device (hereinafter abbreviated to a host) 1 through a host interface 2, and functions as an external storage device of the host 1. The host 1 is a personal computer, a cellular phone, or an imaging device, for example.

The memory system 100 includes NAND flash memory (hereinafter abbreviated to NAND) 10 serving as non-volatile semiconductor memory, a controller 90 that receives and transmits a command and data to the host 1 through the host interface 2 and executes various processes, such as a writing process or a reading process, to the NAND 10 based upon the host command, a power supply circuit 50 that supplies power supply to each circuit in the SSD 100, a chargeable battery (capacitor) 55 serving as a backup power source, a clock generator 60 that supplies a clock signal CK to each circuit in the SSD 100, and EEPROM (Electrically Erasable Programmable Read-Only Memory) 4 serving as non-volatile semiconductor memory.

The NAND 10 stores user data transmitted from the host 1, management information of the memory system 100, and system data. The NAND 10 includes a memory cell array having plural memory cells arranged in a matrix. The individual memory cell can perform multi-value storage by using upper pages and lower pages. The NAND 10 includes plural memory chips, and each memory chip includes a plural physical of blocks being units of data erasing. In the NAND 10, a data writing process and a data reading process are performed for each physical page. The physical block includes plural physical pages.

The controller 90 includes a front end unit 90A located close to the host 1, and a back end unit 90B located close to the NAND 10 around RAM 20 and RAM 30.

The RAM 20 serving as the volatile semiconductor memory includes a data buffer 21 that temporarily stores write data from the host 1 and read data from the NAND 10, and a memory area that stores and updates management information 22 such as a mapping table mapping a logical address (e.g., LBA: Logical Block Addressing) transmitted from the host 1 and a storage position of data on the NAND 10. The management information 22 is stored in the NAND 10, and the management information stored in the NAND 10 is developed on the RAM 20 at the time of startup of the memory system 100 or the like. The management information 22 on the RAM 20 is saved in the NAND 10 periodically or upon the power shutdown.

The RAM 30 serving as the volatile semiconductor memory has recorded thereon a progress log indicating progress information of the saving process (hereinafter referred to as a data saving process) of the data and the management information, when invalid power shutdown occurs. The progress log will be described in detail later. The RAM 30 has an access latency shorter than that of the EEPROM 4.

The front end unit 90A includes a host interface 2, a CPU 3, and a timer 5. The back end unit 90B includes a CPU 6, and a NANDC 7. The memory system 100 has two CPUs that are the CPU 3 serving as a processor for controlling the front end unit 90A and the CPU 6 serving as a processor for controlling the back end unit 90B. The function executed by the CPU 3 is realized by software (firmware) operated on the CPU 3. The function executed by the CPU 6 is realized by software (firmware) operated on the CPU 6.

The CPU 3 in the front end unit 90A mainly has a function of processing a command including a data access from the host 1, and executes control of storing the write data received from the host 1 into the data buffer 21 in the RAM 20 through the host interface 2 and transmitting the read data from the NAND 10 stored in the data buffer 21 in the RAM 20 to the host 1 through the host interface 2. The CPU 3 can make an access to the EEPROM 4, but cannot make an access to the NAND 10.

The host interface 2 receives the command, such as the read command or the write command, from the host 1 via a communication interface such as SATA (Serial Advanced Technology Attachment) or SAS (Serial Attached SCSI). When receiving the write command from the host 1, the host interface 2 secures a necessary buffer area on the data buffer 21 according to the control of the CPU 3.

The timer 5 generates a periodic interruption on the CPU 3.

The CPU 6 in the back end unit 90B performs a data transfer between the data buffer 21 in the RAM 20 and the NAND 10 to execute various processes, such as the writing process or reading process, to the NAND 10. Specifically, the CPU 6 stores the write data stored in the data buffer 21 in the RAM 20 into the NAND 10 via the NANDC 7, and stores the read data read from the NAND 10 into the data buffer 21 in the RAM 20 via the NANDC 7. The CPU 6 also executes the update and the non-volatilization control of the management information 22 such as the mapping table indicating the correspondence relation between the logical address applied from the host 1 and the physical address (memory position) in the NAND 10, and organization of the NAND 10 (garbage collection, and compaction). The CPU 6 can make an access to the NAND 10, but cannot make an access to the EEPROM 4.

The CPU 6 in the back end unit 90B executes a process of storing the management information 22 or the data, stored in the data buffer 21 in the RAM 20, into the NAND 10 via the NANDC 7, and executes, in parallel with the storing process, a process of storing the progress log indicating the progress or an error condition of the storing process into the RAM 30, when an invalid power shutdown occurs.

The NAND controller (NANDC) 7 controls the drive of the NAND 10. The NANDC 7 includes, for example, a NAND interface performing an interface process with the NAND 10, an error correction circuit, and a DMA controller. The NANDC 7 writes the data, which is temporarily stored in the data buffer 21 in the RAM 20, into the NAND 10, or reads the data stored in the NAND 10 and transfers the same data to the data buffer 21 in the RAM 20, based upon the control of the CPU 6.

The progress log stored in the RAM 30 is stored in the EEPROM (Electrically Erasable Programmable Read-Only Memory) 4 serving as the non-volatile semiconductor memory, when invalid power shutdown occurs. The transfer of the progress log from the RAM 30 to the EEPROM 4 is performed by The CPU 3 in the front end unit 90A.

The power supply circuit 50 converts DC electric power supplied from an external power supply circuit (external power source) 51 into plural different internal DC power-supply voltages, and supplies the internal DC power-supply voltages to each circuit in the SSD 100. The power supply circuit 50 might receive an electric power supply from the host 1 via a supply cable such as the SATA. When detecting the invalid interruption of electric power supply from the external power source 51, the power supply circuit 50 switches the power supply to the electric power supply from the battery 55, and notifies the CPU 3 in the front end unit 90A of invalid power shutdown notification indicating the invalid interruption of the power supply from the external power source 51. According to this notification, the CPU 3 in the front end unit 90A notifies the CPU 6 in the back end unit 90B of the reception of the invalid power shutdown notification. Thus, the CPU 3 in the front end unit 90A and the CPU 6 in the back end unit 90B execute an invalid power shutdown process in cooperation with each other.

When the power supply is switched to the battery 55 serving as the backup power source due to the invalid power shutdown, the data and the management information 22 that have to be saved are basically stored in the RAM 20, and the CPU 6 in the back end unit 90B stores the data and the management information 22 on the RAM 20 into the NAND 10 via the NANDC 7.

A comparative example will be described here. In the comparative example, the progress log on which the progress information of the data saving process is recorded is recorded in external non-volatile memory of the controller 90 by the CPU 6 in the back end unit 90B. Specifically, the CPU 6 in the back end unit 90B has to execute the saving process for saving the data and the management information to the NAND 10 and the process of recording the progress log, which is the progress information, to the non-volatile memory. The progress log can be stored in the NAND 10. However, considering that progress log that is useful for the data recovery and the failure analysis has to be stored in a short backup time, it is desirably stored in the non-volatile memory that can be accessed with high speed because of the access latency shorter than the NAND 10.

In the comparative example, the CPU 6 in the back end unit 90B executes both the data saving process and the process of storing the progress log. Therefore, the data saving process, which should originally have priority over the progress log recording process, might be delayed. After the invalid power shutdown occurs, and the changeover to the backup power source 55 is performed, the CPU 3 in the front end unit 90A has no process that is to be executed, except for the process of blocking the command from the host 1. Therefore, the CPU 3 wastes electric power.

Accordingly, in the comparative example, an efficient data saving process cannot be executed, so that the power supply backup time becomes short due to the wasted power consumption. This might cause the situation in which the necessary process cannot be finished within the power supply backup time.

In view of this, in the present embodiment, the CPU 6 in the back end unit 90B executes the data saving process from the RAM 20 to the NAND 10, and executes the process of recording the progress log on the RAM 20. The CPU 3 in the front end unit 90A stores the progress log recorded on the RAM 20 into the non-volatile semiconductor memory such as the EEPROM 4.

Figure 2:
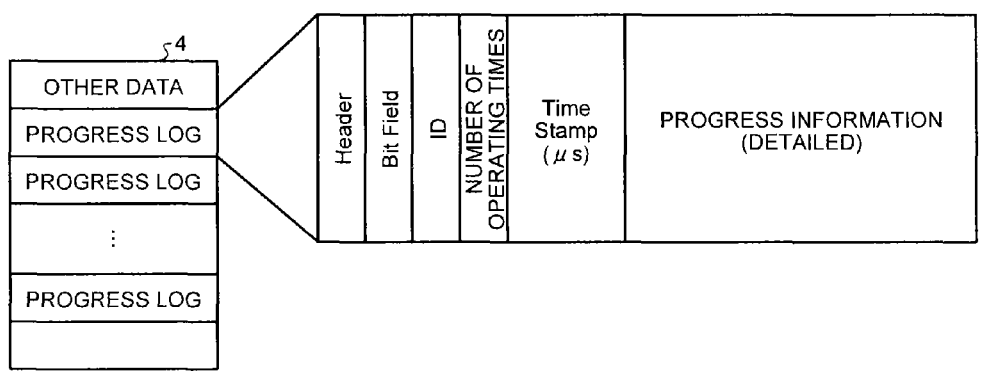
FIG. 2 is a view illustrating an example of a format of a progress log.

The operations of the CPU 3 and the CPU 6 will be described in detail below. Firstly, the progress log will be described with reference to FIG. 2. As illustrated in FIG. 2, the EEPROM 4 has plural entries in order to be capable of storing the progress logs (PLP: Power Loss Protection log) for plural sequences. During the process of recording the progress logs for plural sequences, the PLP log for the start is firstly recorded, and then, plural PLP logs in operation (during the operation) are recorded. Finally, the PLP log for the completion is recorded.

FIG. 2 illustrates a format of the PLP log. On a Header field, it is identified whether the PLP log is the start, in operation, or the completion. On a Bit Field, it is identified whether the data saving process recorded on this PLP log is normal or not. On an ID field, a sequence number of this PLP log is identified. On a number of operating times field, it is identified how many times, in total, the data saving process is executed before this data saving process by the memory system 100. On a Time Stamp field, an elapsed time from the start of the data saving process is recorded. On a progress information field, the detailed progress content of the data saving process is recorded.

Figure 3:
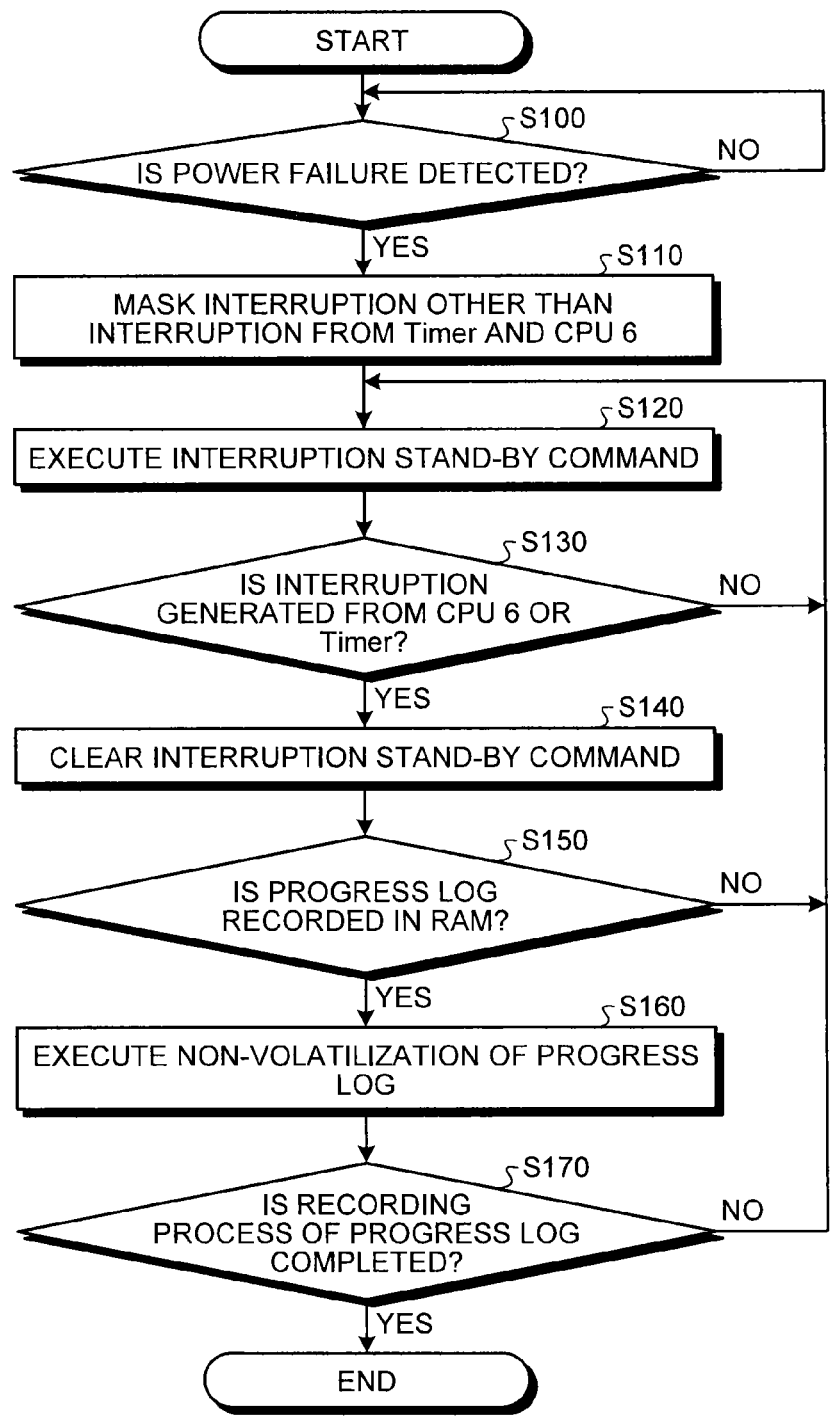
FIG. 3 is a flowchart illustrating a procedure of an operation of a CPU in a front end unit.

The procedure of the operation of the CPU 3 in the front end unit 90A will be described below with reference to FIG. 3.

When detecting the invalid interruption of electric power supply from the external power source 51, the power supply circuit 50 switches the power supply to the electric power supply from the battery 55, and notifies the CPU 3 in the front end unit 90A of the invalid power shutdown notification indicating the invalid interruption of the power supply from the external power source 51. According to this notification, the CPU 3 for the front end unit 90A notifies the CPU 6 in the back end unit 90B of the reception of the invalid power shutdown notification. Thus, the CPU 3 in the front end unit 90A and the CPU 6 in the back end unit 90B detect the invalid power failure (step S100), and then, execute the invalid power shutdown process.

When detecting the invalid power failure, the CPU 6 in the back end unit 90B executes a process of storing the management information 22 or the data, stored in the data buffer 21 in the RAM 20, into the NAND 10 via the NANDC 7, and executes, in parallel with the storing process, sequentially a process of storing the progress logs, indicating the progress or an error condition of the data storing process, for the plural sequences illustrated in FIG. 2 into the RAM 30.

The CPU 3 in the front end unit 90A masks an interruption (an interruption from the host interface 2 or the like) from a peripheral device other than the interruption from the timer 5 and the interruption from the CPU 6, and allows only the interruption from the timer 5 and the interruption from the CPU 6. The timer 5 periodically generates the interruption to the CPU 3, and the CPU 6 generates the interruption when the progress log is written to the RAM 30.

Next, the CPU 3 in the front end unit 90A executes an interruption stand-by command, whereby the CPU 3 is brought into a stand-by state in which a power consumption is smaller than the ordinary state (step S120). When detecting the interruption from the timer 5 or the interruption from the CPU 6, the CPU 3 clears the interruption stand-by command (step S140), returns from the stand-by state, and confirms whether the progress log is recorded on the RAM 30 or not (step S150). When determining that the progress log is not recorded on the RAM 30 (No in step S150), the CPU 3 again executes the interruption stand-by command (step S120) to bring the CPU 3 into the stand-by state.

When determining that the progress log is recorded on the RAM 30, the CPU 3 reads the progress log recorded on the RAM 30, and stores the read progress log into the EEPROM 4 in order to attain the non-volatilization of the progress log (step S160). During the non-volatilization of the progress log, the CPU 3 may read the progress log recorded on the RAM 30, and modify the read progress log into a predetermined format according to need.

Then, the CPU 3 determines whether all progress logs are recorded or not (step S170). When not all progress logs are recorded, the process proceeds to step S120. In step S120, the CPU 3 executes the interruption stand-by command to again bring the CPU 3 into the stand-by state. Thereafter, the CPU 3 returns from the stand-by state by the interruption from the timer 5 or the interruption from the CPU 6, and confirms whether the progress logs are recorded on the RAM 30 (steps S130 to S150). When determining that the progress log is recorded on the RAM 30, the CPU 3 reads the progress log recorded on the RAM 30, and stores the read progress log into the EEPROM 4 in order to attain the non-volatilization of the progress log (steps S160, S170). The CPU 3 repeats the process described above until the recording of all progress logs is completed by recording the progress log having the Header for the completion.

The host interface 2 has no particular process to be executed during the power failure process. Therefore, the supply of clock to the host interface 2 from the clock generator 60 is stopped to reduce power consumption. The clock supply is continued to the other internal circuits.

The same electronic circuit may be used for the RAM 30 performing the process of recording the progress log and for the RAM 20 performing the data saving process. However, they may be desirably composed of a different circuit in order to prevent competition between the data saving process and the progress log recording process.

In the embodiment described above, the CPU 3 is returned from the stand-by state by the interruption from the timer 5 and the interruption from the CPU 6. However, the CPU 3 may be returned from the stand-by state only by the interruption from the timer 5, or may be returned from the stand-by state only by the interruption from the CPU 6 indicating the writing of the progress log into the RAM 30.

As described above, in the present embodiment, the CPU 6 in the back end unit 90B concentrates on the data saving process to the NAND 10, whereby the time taken for the data saving process can be minimized. The process executed by the CPU 6 in the back end unit 90B and required for recording the progress log is minimized, and the progress log is recorded on the RAM 30 having the shorter access latency than the external non-volatile memory such as the EEPROM 4. Thus, the load of the CPU 6 caused by the recording of the progress log is reduced. The CPU 3 in the front end unit 90A stores the progress log into the external non-volatile memory. However, the CPU 3 does not always operate, but periodically wakes up and records the progress log if necessary, whereby the power consumption can be suppressed. Accordingly, in the present embodiment, the electric power consumed by the progress log recording process is reduced, with the result that the power consumption for the data saving process is reduced. Consequently, the power supply backup time can be extended.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a first non-volatile memory including a plurality of blocks being units of data erasing;
   a second non-volatile memory;
   a first volatile memory;
   a second volatile memory;
   a power supply circuit having a backup power source, the power supply circuit configured to supply externally supplied electric power to each unit in the memory system;
   a first processor configured to transmit and receive a command to a host, and configured to store data received from the host into the first volatile memory; and
   a second processor configured to transfer management information stored in the first non-volatile memory to the first volatile memory at time of startup of the memory system, and configured to store the data stored in the first volatile memory into the first non-volatile memory by using the transferred management information, wherein
   the power supply circuit is configured to supply the electric power from the backup power source to each unit in the memory system and is configured to notify the first processor of an interruption of external electric supply when detecting the interruption of the external electric power supply,
   when being notified of the interruption of the external electric power supply from the first processor, the second processor is configured to perform a saving operation for storing the management information and the data stored in the first volatile memory to the first non-volatile memory and is configured to record a progress log, indicating a progress of the saving operation, into the second volatile memory, and
   when being notified of the interruption of the external electric supply from the power supply circuit, the first processor is configured to notify the second processor of the interruption of the external electric power supply and is configured to check periodically whether or not the progress log is recorded in the second volatile memory, and when the progress log is recorded in the second volatile memory, the first processor is configured to store the progress log into the second non-volatile memory.

2. The memory system according to claim 1, wherein
   the first processor cannot access to the first non-volatile memory, and
   the second processor cannot access to the second non-volatile memory.

3. The memory system according to claim 1, wherein
   the first processor is configured to change to a stand-by state in which power consumption is smaller than an ordinary state, when being notified of the interruption of the external electric supply from the power supply circuit, and by a periodic interruption from a timer, the first processor is released from the stand-by state and is configured to determine whether the progress log is recorded in the second volatile memory or not.

4. The memory system according to claim 1, wherein
   the first processor is configured to change to a stand-by state in which power consumption is smaller than an ordinary state, when being notified of the interruption of the external electric supply from the power supply circuit, and by an interruption from the second processor, the first processor is released from the stand-by state and is configured to determine whether the progress log is recorded in the second volatile memory or not.

5. The memory system according to claim 1, further comprising:
   a host interface connectable to the host; and
   a clock generator that supplies a clock signal to each unit in the memory system, wherein
   the clock generator is configured to stop the supply of the clock to the host interface when being notified of the interruption of external electric power supply from the power supply circuit.

6. The memory system according to claim 1, wherein
   the second volatile memory has an access latency shorter than that of the second non-volatile memory.

7. The memory system according to claim 1, wherein
   the second volatile memory is included in the first volatile memory.

8. A control method of a memory system including:
   a first non-volatile memory including a plurality of blocks being units of data erasing;
   a second non-volatile memory;
   a first volatile memory;
   a second volatile memory;
   a power supply circuit having a backup power source, and supplying externally supplied electric power to each unit in the memory system;
   a first processor that transmits and receives a command to a host, and stores data received from the host into the first volatile memory; and
   a second processor that transfers management information stored in the first non-volatile memory to the first volatile memory at time of startup of the memory system, and stores the data stored in the first volatile memory into the first non-volatile memory by using the transferred management information, the method comprising:
   supplying, by the power supply circuit, the electric power from the backup power source to each unit in the memory system, and notifying the first processor of an interruption of external electric supply when detecting the interruption of the external electric power supply,
   when being notified of the interruption of the external electric power supply from the first processor, performing, by the second processor, a saving operation for storing the management information and the data stored in the first volatile memory to the first non-volatile memory, and recording a progress log, indicating a progress of the saving operation, into the second volatile memory, and
   when being notified of the interruption of the external electric supply from the power supply circuit, notifying, by the first processor, the second processor of the interruption of the external electric power supply, and periodically checking whether or not the progress log is recorded in the second volatile memory, and when the progress log is recorded in the second volatile memory, storing, by the first processor, the progress log into the second non-volatile memory.

9. The control method of a memory system according to claim 8, wherein the first processor cannot access to the first non-volatile memory, and the second processor cannot access to the second non-volatile memory.

10. The control method of a memory system according to claim 8, further comprising:

changing, by the first processor, to a stand-by state in which power consumption is smaller than an ordinary state, when being notified of the interruption of the external electric supply from the power supply circuit, and being released from the stand-by state by a periodic interruption from a timer, and determining whether the progress log is recorded in the second volatile memory or not.

11. The control method of a memory system according to claim 8, further comprising:

changing, by the first processor, to a stand-by state in which power consumption is smaller than an ordinary state, when being notified of the interruption of the external electric supply from the power supply circuit, and being released from the stand-by state by an interruption from the second processor, and determining whether the progress log is recorded in the second volatile memory or not.

12. The control method of a memory system according to claim 8, wherein the memory system further includes:

a host interface connectable to the host; and a clock generator that supplies a clock signal to each unit in the memory system, the method further comprising:

stopping, by the clock generator, the supply of the clock to the host interface when being notified of the interruption of external electric power supply from the power supply circuit.

13. The control method of a memory system according to claim 8, wherein the second volatile memory has an access latency shorter than that of the second non-volatile memory.

14. The control method of a memory system according to claim 8, wherein the second volatile memory is included in the first volatile memory.

* * * * *